United States Patent [19]

DeFouw et al.

[11] Patent Number: 4,571,907

[45] Date of Patent: Feb. 25, 1986

[54] FRAME CONNECTOR SYSTEM

[75] Inventors: Jerry A. DeFouw, Grand Rapids; James O. Kelley, Spring Lake, both of Mich.

[73] Assignee: Herman Miller, Inc., Zeeland, Mich.

[21] Appl. No.: 641,189

[22] Filed: Aug. 15, 1984

[51] Int. Cl.[4] .......... F16C 1/06

[52] U.S. Cl. .......... 52/239

[58] Field of Search .......... 52/239, 578, 238.1-243, 52/221, 281, 474, 483, 721, 580

[56] References Cited

U.S. PATENT DOCUMENTS

| | | | |
|---|---|---|---|
| Re. 27,215 | 11/1971 | Propst et al. | 52/36 |
| 3,312,025 | 4/1967 | Deakins | 52/239 |
| 3,430,997 | 3/1969 | Propst et al. | 287/189.36 |
| 3,777,434 | 12/1973 | Selden et al. | 52/721 |
| 3,877,191 | 4/1975 | Munsey | 52/632 |
| 3,987,838 | 10/1976 | LaGue et al. | 160/351 |
| 4,047,342 | 9/1977 | Boulva | 52/239 |
| 4,104,838 | 8/1978 | Hage et al. | 52/239 |
| 4,129,163 | 12/1978 | Johnson | 160/135 |
| 4,232,183 | 11/1980 | Person | 174/48 |
| 4,334,374 | 6/1982 | Spamer et al. | 52/239 |
| 4,430,838 | 2/1984 | Bains | 52/584 |
| 4,438,614 | 3/1984 | Raith et al. | 52/580 |

*Primary Examiner*—Lenard A. Footland

*Attorney, Agent, or Firm*—Varnum, Riddering, Schmidt & Howlett

[57] ABSTRACT

A frame connector system for connecting adjacent frames together to form a wall panel system for offices, for example, comprises rigid frames which have elongated stiles extending the length of opposite sides, each stile having an edge face with an indented channel running along the length and shaped to form a hollow rectangular channel with an abutting edge face of an adjacent frame stile. A rectangular elongated draw tube fits snugly within the rectangular channel between the stiles. A U-shaped draw nut on top of the draw tube has legs which fit within openings in the stiles and engage wedging surfaces on the stiles to draw the stiles tightly together as the draw tube is moved upwardly with respect to the stiles. A cap screw is threaded into the draw nut and engages tongues on the stile to provide a mechanical advantage in shifting the draw tube upwardly with respect to the stiles. Clips are provided within the indented channels of the stiles to project through openings in the draw tube and engage the draw tube as the draw tube is moved upwardly with respect to the stiles. Rigid junction connectors are provided with the same connector system to connect panels together at various angular relationships and to connect multiple panels together.

21 Claims, 10 Drawing Figures

FRAME CONNECTOR SYSTEM

TECHNICAL FIELD

This invention relates to frame connector systems. In one of its aspects, the invention relates to a frame connector system for rigidly connecting together frames of wall systems forming open-office work stations.

BACKGROUND ART

Open-plan office systems are formed by connecting together rigid panel frames at facing edges thereof. Prior art systems for connecting rigid panels in these open-plan office systems are disclosed in the following U.S. Pat. Nos.: Deakins, 3,312,025 (issued Apr. 4, 1967); Propst et al, 3,430,997 (issued Mar. 4, 1969); Propst et al, Re. 27,215 (issued Nov. 2, 1971); Munsey, 3,877,191 (issued Apr. 15, 1975); LaGue et al, 3,987,838 (issued Oct. 26, 1976); Boulva, 4,047,342 (issued Sept. 13, 1977); Hage et al, 4,104,838 (issued Aug. 8, 1978); Johnson, 4,129,163 (issued Dec. 12, 1978); Person 4,232,183 (issued Nov. 4, 1980).

Propst et al in U.S. Pat. No. 3,430,997 discloses and claims a panel joint system in which the stiles of the frame have upper and lower wedging members affixed to the facing edges and upper and lower wedge mating members are disposed for movement in a direction parallel to the vertical edges of the stile to engage the upper and lower wedging members on the stiles. The wedge mating members are joined by a tie bar and a mechanical advantage means on the tie bar forces the upper and lower wedge mating members together to rigidly lock adjacent panels together.

The U.S. Pat. No. Re. 27,215 to Propst et al, discloses and claims a panel connector having a pair of U-shaped channels secured to panel edges through screws with frustoconical wedging surfaces and a tubular spline connector with pear-shaped slots are provided to engage the screws 30. A lift cap is secured to the top of the spline connector by means of pins. A bearing plate rests on top of the channels and has a bolt which is journaled in the hole and threaded into a tapped hole of the lift cap 42. Tightening of the bolt draws the spline upwardly to bring the wedging-surface screws to the bottom of the spline holes, thereby drawing the panels tightly together.

The patent to Deakins discloses a partition connector in which upwardly and outwardly projecting tabs on a central spline engage downwardly and outwardly projecting tabs on the panel edges.

The patent to Munsey and the patent to Hage et al disclose connector assemblies for panels in which connector hooks on the top and the bottom of the panels fit into slots in a vertical post to connect the panel to the post. A cap is threaded down onto the hook on top of the panels to prevent disengagement of the panels from the slots.

The patent to LaGue et al discloses a panel connection system in which tubular members have T-shaped ribs to engage slots in the panel to slidably connect the tubular members to the panel.

The patent to Boulva discloses a panel connector system in which a bridging device has holes in the top and the bottom. Vertically disposed screws or other lugs secured to the panel are received in the holes in the bridging device for securing the panels together.

The patent to Johnson discloses a connector system in which connector tubes have projecting lugs which are slidably received in the channels in the panel edges.

The U.S. Pat. No. 4,232,183 to Person discloses a panel connection system in which clips having depending lugs engage slots in connector tubes. The connector tube is formed in several parts and is joined together through an elongated rod which is threaded at the upper and lower ends thereof.

DISCLOSURE OF INVENTION

According to the invention, a frame connector system is provided for rigidly connecting adjacent frames together at facing edges. The connector system has significant lateral shear strength, horizontal rigidity and strength between panels. It is quickly and easily assembled with a minimum of parts and is easy to manufacture through conventional manufacturing techniques.

The connector according to the invention comprises rigid frames, each of which has elongated stiles extending the length of opposite ends thereof, each stile having an edge face with an indented channel running along the length thereof and shaped to form a hollow channel, preferably rectangular in cross-section, with an abutting edge face of an adjacent frame stile. An elongated draw tube, preferably rectangular in cross-section, is positioned within the hollow channel and has a cross-sectional shape complementary to the hollow channel so as to fit snugly therein. Interengaging wedge means are provided on the draw tube and the stiles so as to draw the abutting edge faces of the adjacent frame stiles together upon relative longitudinal movement of the draw tube with respect to the frame stiles. A mechanical advantage adjusting means between the adjacent frame stiles and the draw-tube wedge means forcibly shifts the draw tube lengthwise and thereby draws the adjacent frame stiles tightly together. The interfitting relationship between the elongated draw tube and hollow channel provide lateral shear strength between the adjacent frames.

The draw-tube wedge means is preferably secured to an upper portion of the draw tube and the stile wedge means is secured to an upper portion of the stile. The mechanical advantage adjusting means typically comprises a threaded fastener one end of which engages the draw-tube wedge means and a means on the stile engages the other end of the threaded fastener. Preferably, the draw-tube wedge means is U-shaped in elevation and has legs which extend through openings in the stiles. The legs of the draw-tube wedge means have an inside surface which slants upwardly and inwardly and the stile wedge means has a complementary surface which extends downwardly to engage the inside surface of the draw-tube wedge means legs.

At least one additional opening is provided in the indented channel or the draw tube and at least one outwardly-projecting engagement finger is provided on the other of the indented channel and the draw tube in registry with and projecting into the opening as the draw tube is initially positioned within the indented channel. The finger is adapted to engage the other of the indented channel and the draw tube as the draw tube is shifted lengthwise by the mechanical advantage adjusting means to draw and maintain the adjacent stiles together. Preferably, a plurality of the engagement fingers are spaced along the length of the indented channel or the draw tube and there are a plurality of corresponding additional openings spaced along the indented channel or draw tube in registry with the engagement fingers. The fingers are preferably struck outwardly from the indented channel of the stiles and have a horizontal flexure axis. Further, a strengthening rib preferably extends vertically along the length of the engagement fingers.

BRIEF DESCRIPTION OF THE DRAWINGS

The invention will now be described with reference to the accompanying drawings in which.

BEST MODE FOR CARRYING OUT THE INVENTION

Figure 1:
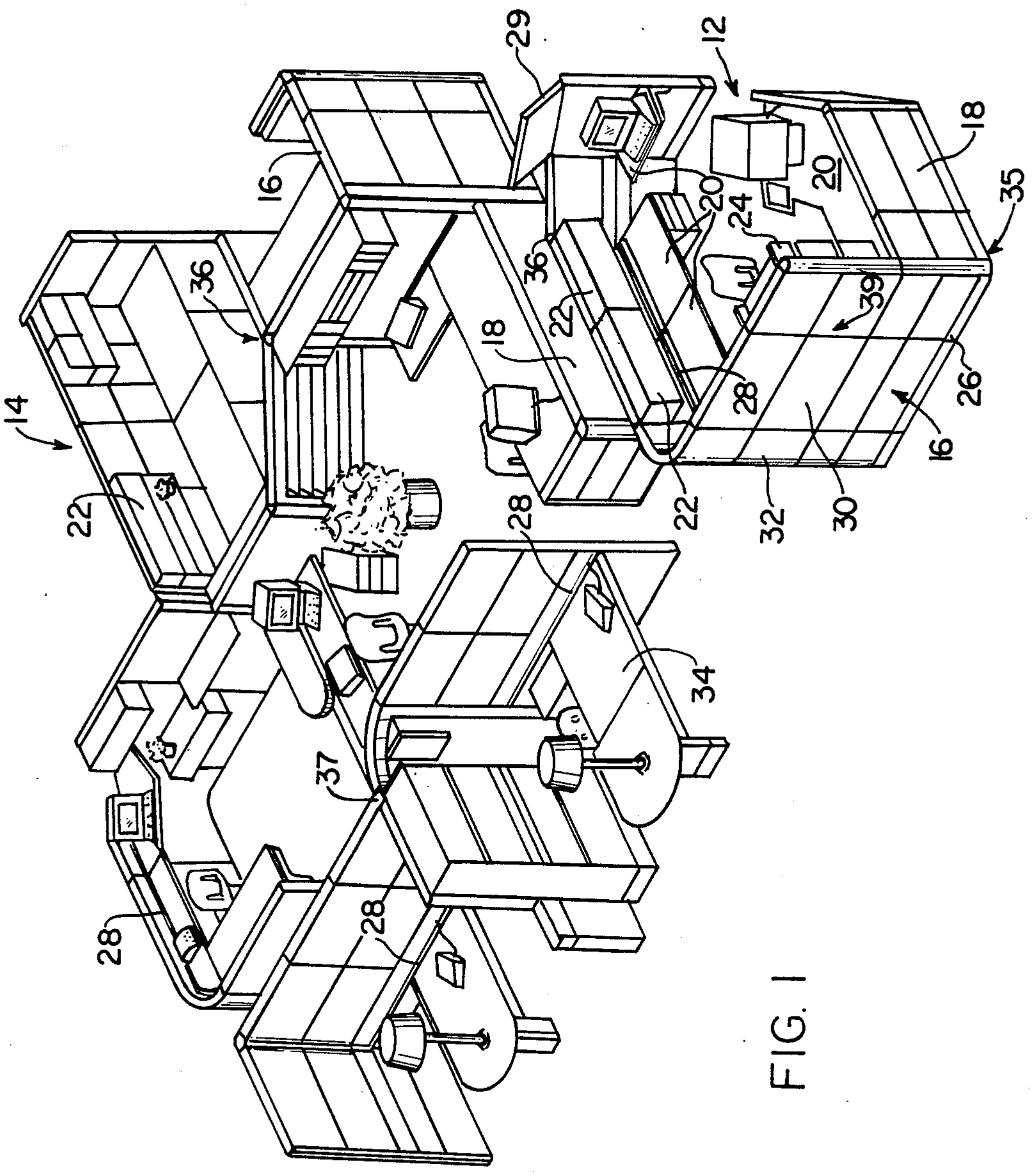
FIG. 1 is a perspective view of an office layout incorporating frames with connector systems according to the invention.
Figure 2:
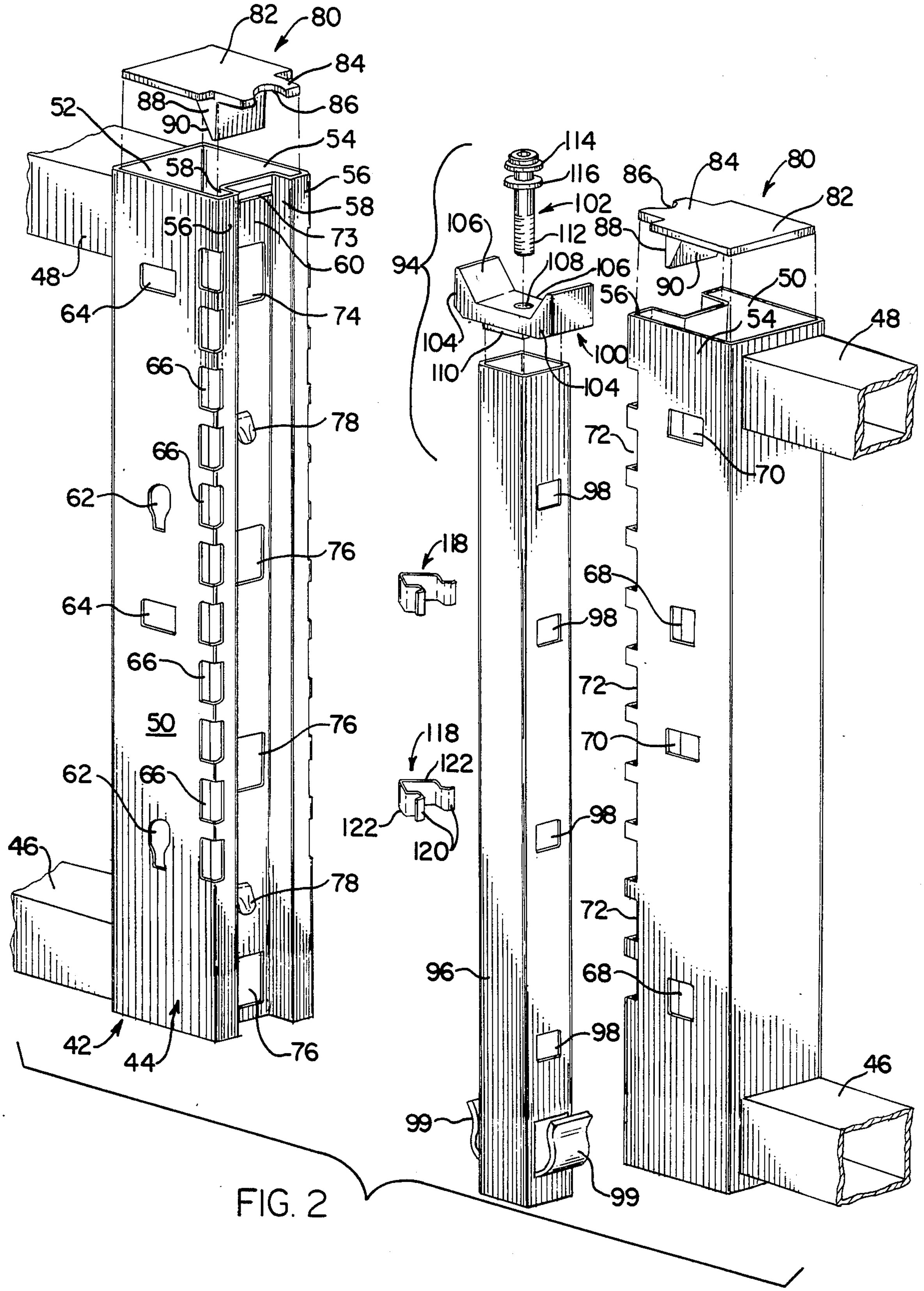
FIG. 2 is an exploded view of a frame connector system according to the invention.

Referring now to the drawings, and to FIG. 1 in particular, there is shown an office layout system having a single work station panel system 12 and a multiple work station panel system 14. The work stations are formed by selected full-sized walls 16 and short walls 18. Each of the walls 16 and 18 are formed by panel segments, joined together at facing edges thereof. Work surfaces 20, cabinets 22 and shelves 24 are supported in cantelevered fashion from both the full-sized walls 16 and the short walls 18. Base-line wiring 26 and belt-line wiring 28 are provided at selected locations along both the short walls 18 and the full-sized walls 16. The walls are formed by straight panel sections 30 and curved panel sections 32. Ninety-degree joints 35, 120° joints 36 and T-wall joint connections 38 are formed between various panels as desired. Further, straight-wall connection 39 are formed between both straight-wall and curved-wall sections.

Referring now to FIGS. 2–5, there is shown a straight-wall connection 39, for example, between two straight-wall sections. The wall sections are aligned coaxially to form an integral straight-wall section. The wall sections are formed from frames 42 and removable outsert panels (not shown) which are removably secured to the frames. The frames 42 are formed by vertical stiles 44, bottom cross-members 46 and top cross-members 48, all joined together through welding to form a rigid interlocking rectangular frame. The stiles 44 are identical and accordingly only one stile will be described.

The stiles 44 have a side face 50, an inside face 52, which is welded to the bottom cross-member 46 and the top cross-member 48, a side face 54 and an outside face 56. A U-shaped trough, formed by trough side walls 58 and trough bottom wall 60, extends the length of the stile along the outside face 56.

Keyhole slots 62 and rectangular slots 64 are spaced along the side face 50 to releasably retain the outsert panels. An aligned row of vertical slots 66 is provided at the corner between the side face 50 and the outside face 56. These vertical slots are used for hanging the work surfaces 20, the cabinets 22 and the shelves 24 from the frames through conventional brackets (not shown).

Rectangular slots 68 and rectangular slots 70 are spaced along the side face 54. The keyhole slots 62 and the rectangular slots 64, 68 and 70 are used to removably secure the outsert panels to the frames through clips (not shown). A series of aligned vertical slots 72 are provided between the side face 54 and the outside face 56 for hanging of work surfaces, shelves and cabinets through conventional brackets (not shown).

A top slot 73, an upper rectangular opening 74 and lower rectangular openings 76 are provided in spaced relationship along the trough bottom wall 60. A pair of struck engagement fingers 78, each of which has a strengthening ridge 79, are struck outwardly and downwardly from the trough bottom wall 60.

Figure 3:
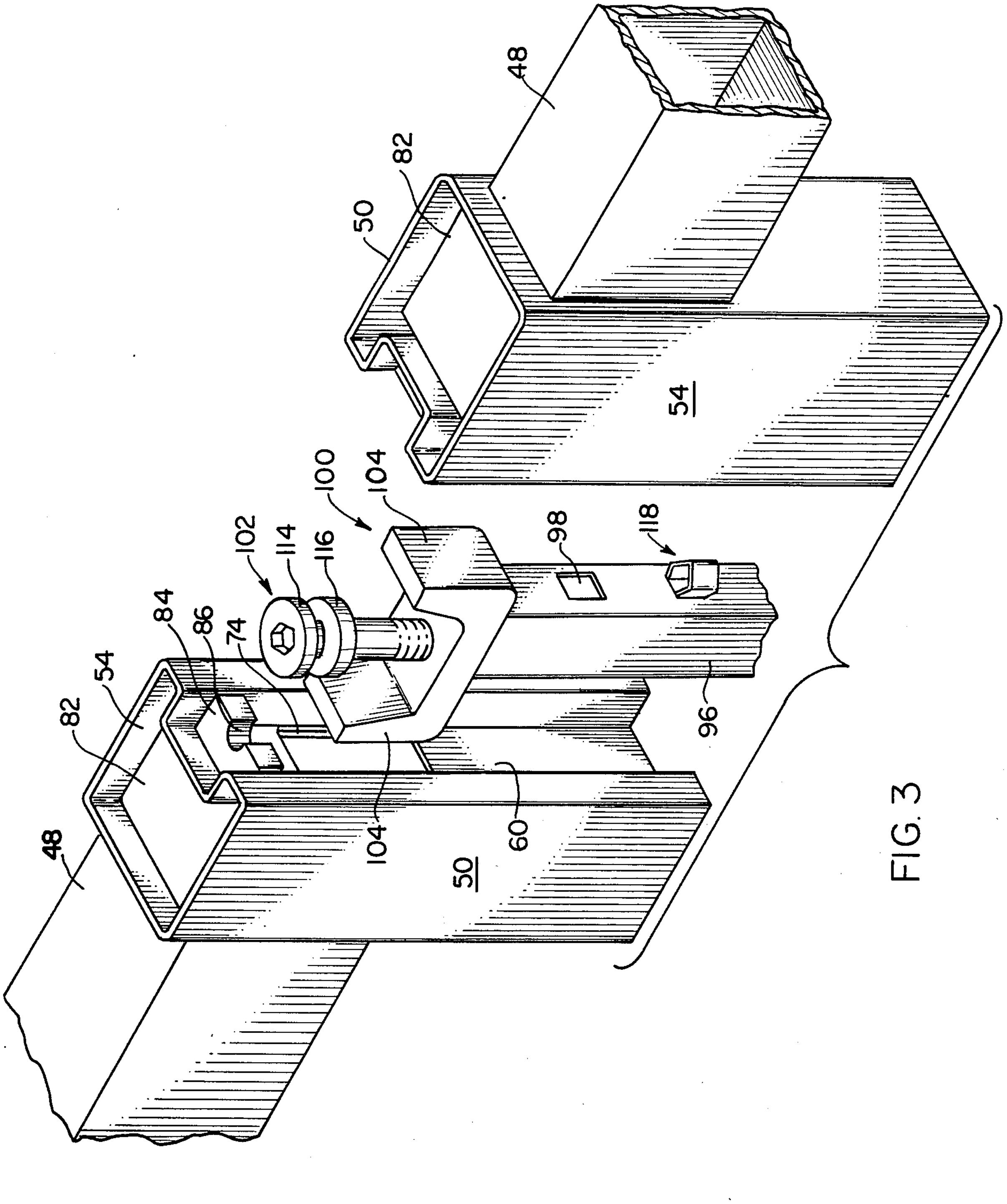
FIG. 3 is a perspective exploded view of assembled components of frame connector systems shown in FIG. 2.
Figure 5:
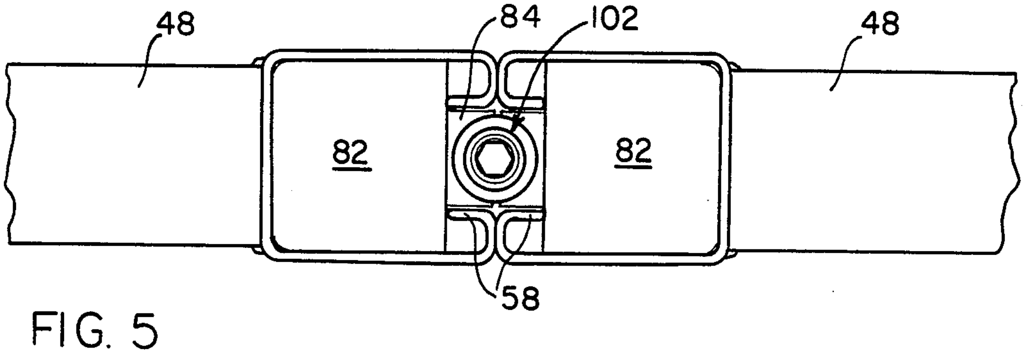
FIG. 5 is a plan view of an assembled connector shown in FIG. 4.
Figure 4:
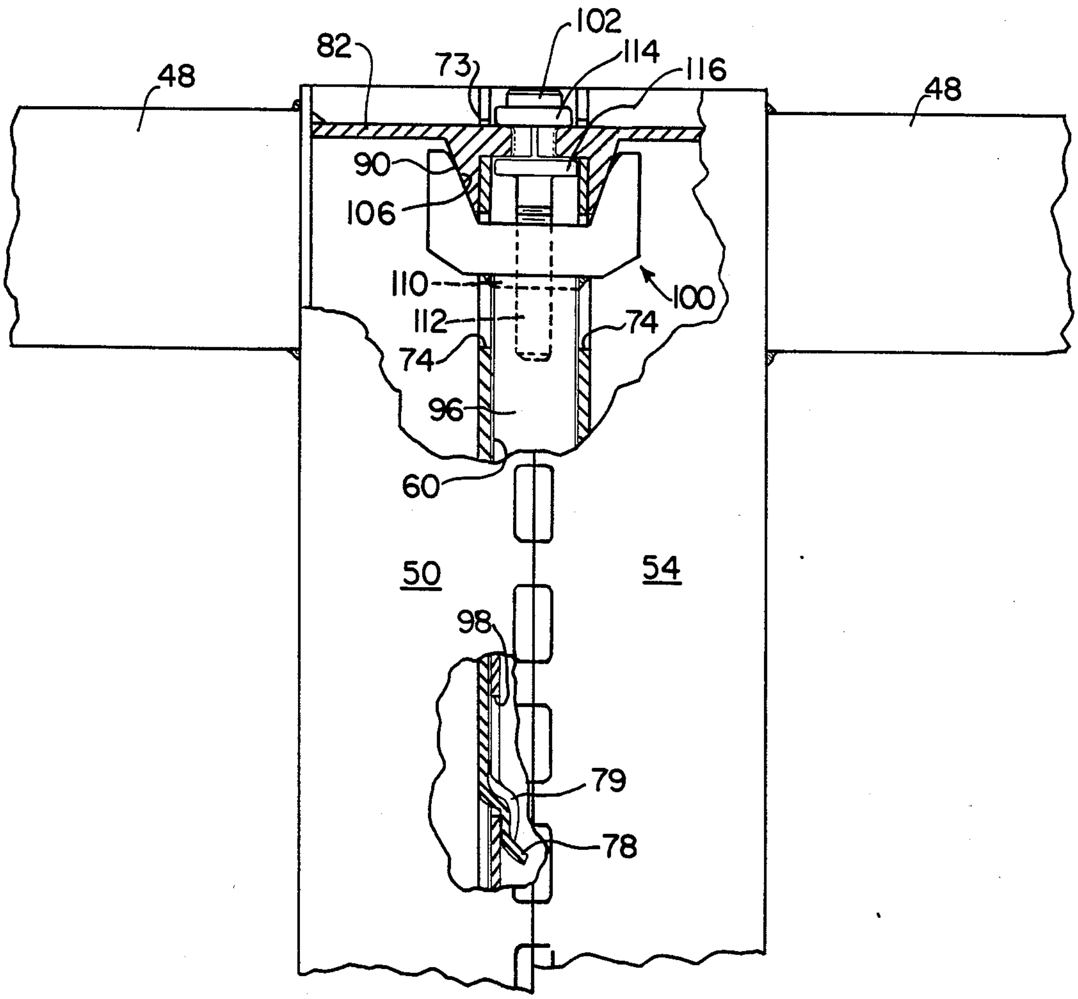
FIG. 4 is a front elevational view of an assembled frame connector system, partially broken away.

A reaction plate 80 has a top plate 82 with an outwardly-projecting tongue 84, the outer end of which forms a U-shaped slot 86 and a depending block 88. A wedging surface 90 is provided on the outer surface of the depending block 88. As illustrated in FIGS. 3 and 4, the outwardly-projecting tongue 84 extends through the top slot 73. The reaction plate 80 is welded at the top plate to the stile 44.

A draw-tube assembly 94 comprises a rectangular draw tube 96, a draw nut 100 and a threaded shoulder cap screw 102. The rectangular draw tube 96, which can be formed by roll-forming, has a number of equally spaced openings 98 and a pair of upwardly directed retaining clips 99. The clips 99 can be formed by an extrusion which is inserted into the draw tube in a snap-fit connection.

The draw nut 100 is U-shaped in elevational view and has upstanding sides 104 with slanted inner wedging surfaces 106. As illustrated in FIG. 4, the slanted wedging surfaces 106 define a complementary angle with the wedging surfaces 90 of the reaction plate 80. A threaded opening 108 is provided through the center of the draw nut 100. An attaching plate 110 projects from the bottom surface of the draw nut and is shaped to fit within the top portion of the draw tube 96. The draw tube 96 is secured to the draw nut 100 through welding or through a mechanical fastening technique at attaching plate 110.

The threaded shoulder cap screw 102 has a depending threaded shank 112 and a pair of spaced annular shoulders 114 and 116. As illustrated in FIG. 4, the shoulders 114 and 116 are spaced a distance so as to receive the outwardly-projecting tongue therebetween while the shank between the shoulders 114 and 116 fits within the U-shaped slot 86 of the reaction plate 80.

A pair of U-shaped spring clips 118 have outwardly directed retaining flanges 120 at the ends thereof and retaining projections 122 at the central portions of the side of the clip. The spring clips 118 fit within the openings 98 in the draw tube 96 and are retained thereby. Further, the clips project into the lower rectangular opening 76 in the trough bottom wall 60 to releasably hold the draw-tube assembly 94 on the stile. The spring clips 118 are not structural in nature but simply serve to hold the draw-tube assembly 94 on the stile 44 during transportation and prior to assembly. Only one set of spring clips 118 is thus provided on each stile and draw tube combination.

In operation, the draw-tube assembly 94 is positioned adjacent the stile 44 with the spring clips 118 entering the rectangular openings 76. As the draw tube 96 fits snugly within the trough in the outside face 56 of the stile, the engagement fingers 78 will project into the upper and lowermost rectangular openings 98 of the draw tube 96 and an upwardly directed clip 99 will project through the lowermost opening 76 in wall 60. At the same time, a side 104 of the draw nut 100 will project through the upper opening 74 and the threaded shoulder cap screw 102 is adjusted so that the tongue 84 is received between the shoulders 114 and 116 of the cap screw 102.

The other frame is then positioned adjacent the first frame so that the draw tube snugly fits within the U-shaped trough formed in the outside face 56 of the other assembly. A clip 99 will project through a lowermost hole 76 in the adjacent wall 60. Further, the other side 104 of the draw nut extends through the opening 74 in the trough bottom wall 60 and beneath the depending block 88 of the reaction plate 80. The shoulders 114 and 116 of the threaded cap screw 102 again receive the tongue 84 of the reaction plate 80 in the other stile. The threaded cap screw 102 is then rotated so as to draw the draw tube 96 upwardly. The threaded cap screw 102 along with the tongue 84 thus form a mechanical advantage adjusting means between the draw-tube wedge means (draw nut 100) and the adjacent frame stiles 44. This relative longitudinal movement results in the drawing of the frames tightly together through the interengaging action of the wedging surfaces 106 and 90 and further as a result of the draw-tube openings 98 passing beneath the engagement fingers 78 as well as the engagement fingers 99 passing upwardly behind the wall 60. However, the lateral force provided between the frames is taken up by the draw nut 100 and the reaction plates 80 and to some extent by the clips 99, and not essentially by the engagement fingers 78. Thus, the strength and rigidity of the frames are carried through the draw nut 100 and reaction plates 80 and to some extent by the clips 99. The interlocking relationship between the stiles 44 and the rectangular draw tube 96 provides exceptional lateral stability and rigidity while the draw nut 100 and reaction plate 80 connections provide very rigid and strong linear connections along a horizontal axis which runs along the top of the frames as well as a strong bending moment connection. This combination of axial and lateral rigidity connections provides a rigid interlocking framework on which work surfaces, cabinets and shelves can be hung.

Figure 6:
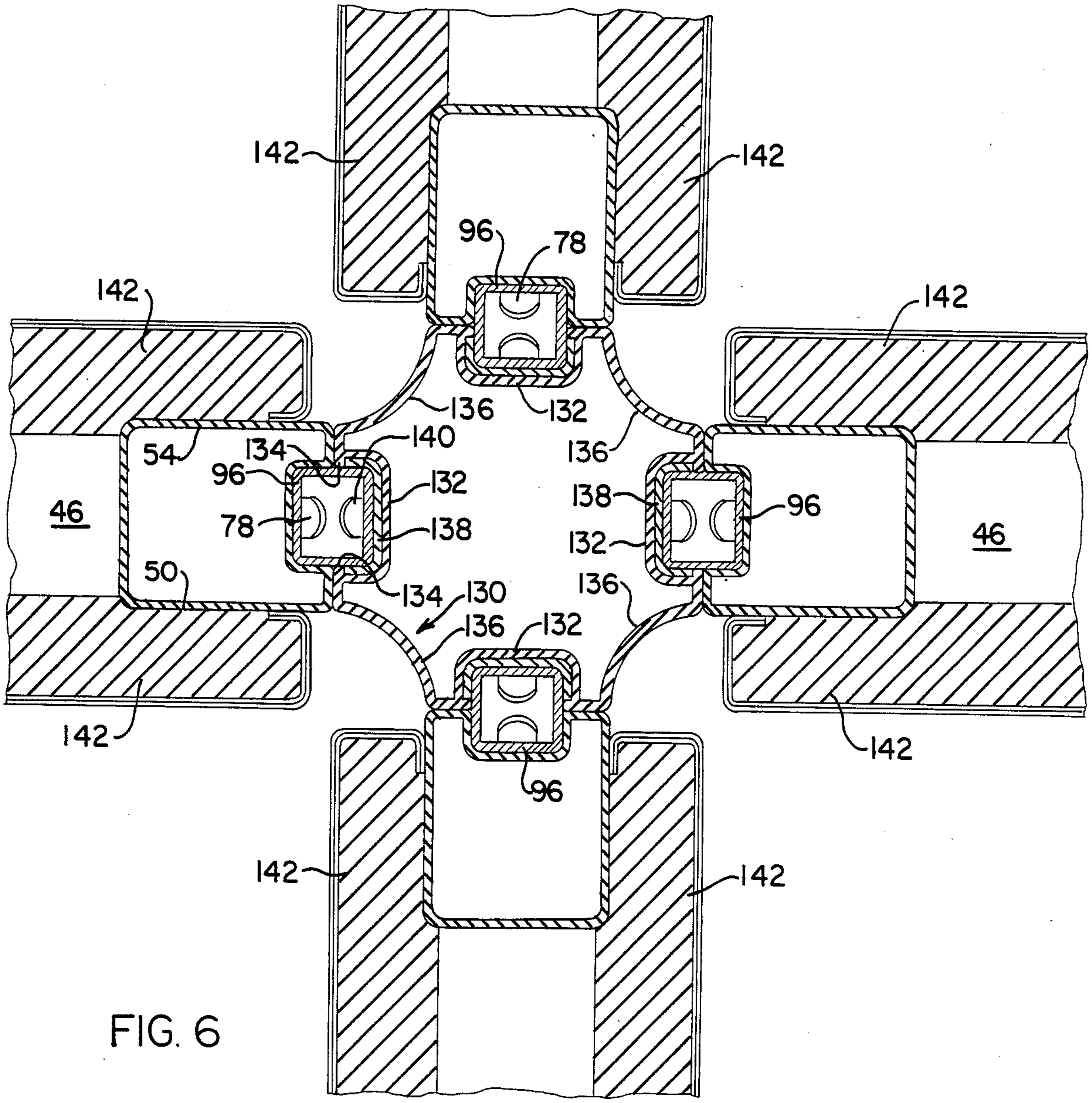
FIG. 6 is a horizontal sectional view of four panels joined together at a common axis with a connector system according to the invention.

Reference is now made to FIG. 6 for a description of a connector for four panels which are joined together. Like numbers are used for like elements. The panel connection system comprises an extruded elongated hollow connector 130 which preferably is made out of aluminum, having four equally spaced indented channels 132. Retaining lips 134 extend inwardly from the edges of the indented channel 132. Arcuate wall portions 136 connect the indented channels 132. A steel U-shaped channel 138 is mounted within the indented channel 132 and retained therein by the retaining lip 134. Additionally, mechanical fastening means such as a screw (not shown) are provided between the U-shaped channel 138 and the indented channel 132 to prevent relative longitudinal movement therebetween. An engagement finger 140 is struck outwardly from the U-shaped channel 138 and extends into the opening 98 in the rectangular draw tube 96. The connector 130 thus joins to each of the frames 42 in the same manner as the frames are joined to each other, that is through a draw-tube assembly 94. All of the connections between the frames and the connector 130 are identical and accordingly only one such connection has been discussed. Outsert panels 142 are shown on the outside of the frames 42.

A three-panel connector similar to the connector illustrated in FIG. 6 (see T-wall connection 38 in FIG. 1) would be identical with the connector shown in FIG. 6 except that one of the indented channels 132 would be absent. In addition, when less than four channels are provided in a connector, indented channels 132 can be spaced at different angles with respect to each other, for example at 120° from each other. See, for example, 120° joint 36 in FIG. 1.

Figure 7:
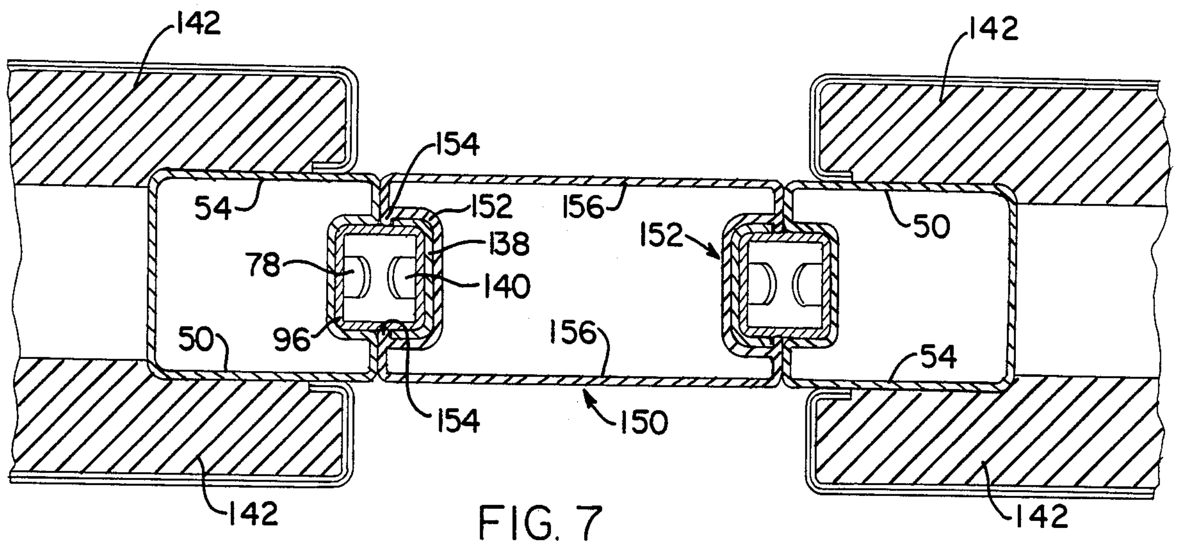
FIG. 7 is a horizontal sectional view of two panels, joined together in spaced relationship, with a modified connector system according to the invention.

Referring now to FIG. 7, there is shown a connection between two frames in spaced-apart relationship. This connection may be used where a small space is required due to use of a four-panel connector as illustrated in FIG. 6 or a three-panel connector (not shown) at another part of the wall system. An extruded elongated hollow connector 150 has a pair of indented channels 152 at either end thereof. Retaining lips 154 extend inwardly from the edge of the indented channels 152 to retain the steel U-shaped channels 138 in the same fashion as the connector illustrated in FIG. 6. Struck engagement fingers 140 extend inwardly from the channel 138 and engage the draw tube 96 in the same fashion as the connector of FIG. 6 and in the same fashion as the connector illustrated in FIGS. 2–5.

Figure 8:
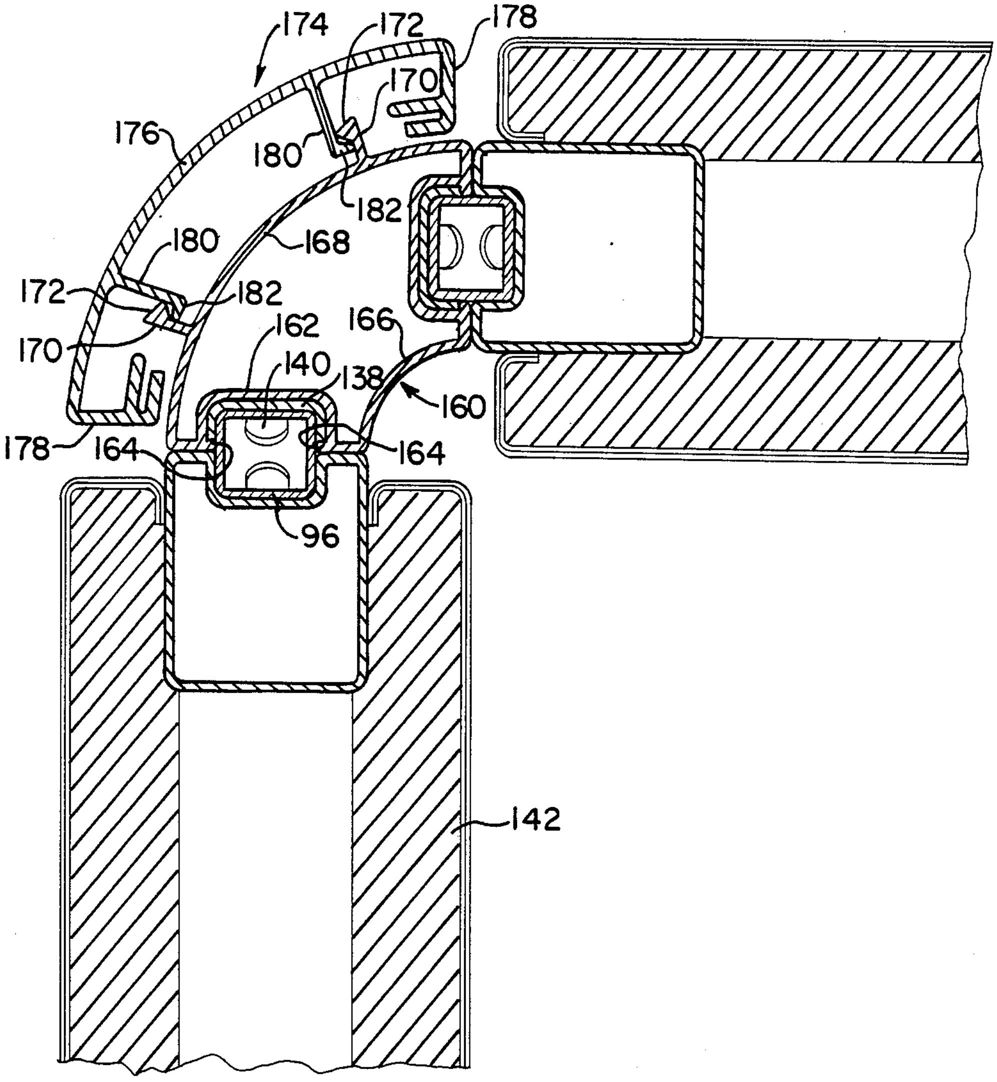
FIG. 8 is a horizontal sectional view of two panels joined together at 90 angles with a connector assembly according to the invention.

Reference is now made to FIG. 8 which shows a 90° corner connector using a connection system according to the invention. Like numerals are used to describe like elements. An elongated corner connector 160 has elongated U-shaped channels 162 at either end thereof and spaced 90° from each other. Retaining lips 164 extend inwardly from the channels to retain therein U-shaped steel channels 138 which have engagement fingers 140 struck into the channels therefrom. The engagement fingers 140 engage draw tubes 96 in the same fashion as the connectors of FIGS. 2–7. An arcuate inner wall 166 and an arcuate outer wall 168 connect the channels 162.

A connector of similar design can be used to connect two panels together in angular relationships greater than 90, simply by changing the angular relationship between the channels 162.

The arcuate outer wall 168 has a pair of outward projections 170, each of which has a retaining lip 172 extending laterally from an outer portion thereof. A cover 174 is provided for snap-fit connection over the arcuate outer wall 168 for plastic finishing flush with the outsert panels 142. The cover can be extruded of any suitable plastic material or can be covered with fabric or vinyl. The cover 174 has a curved outer wall 176 and a pair of inwardly directed end walls 178. Inwardly-projecting flanges 180 extend inwardly from the inside of the curved outer wall 176 and have engaging lips 182 extending laterally thereof. As illustrated in FIG. 8, the retaining lips 172 and 182 engage each other for a snap-fit connection between the curved outer wall 176 and the connector 160.

Figure 9:
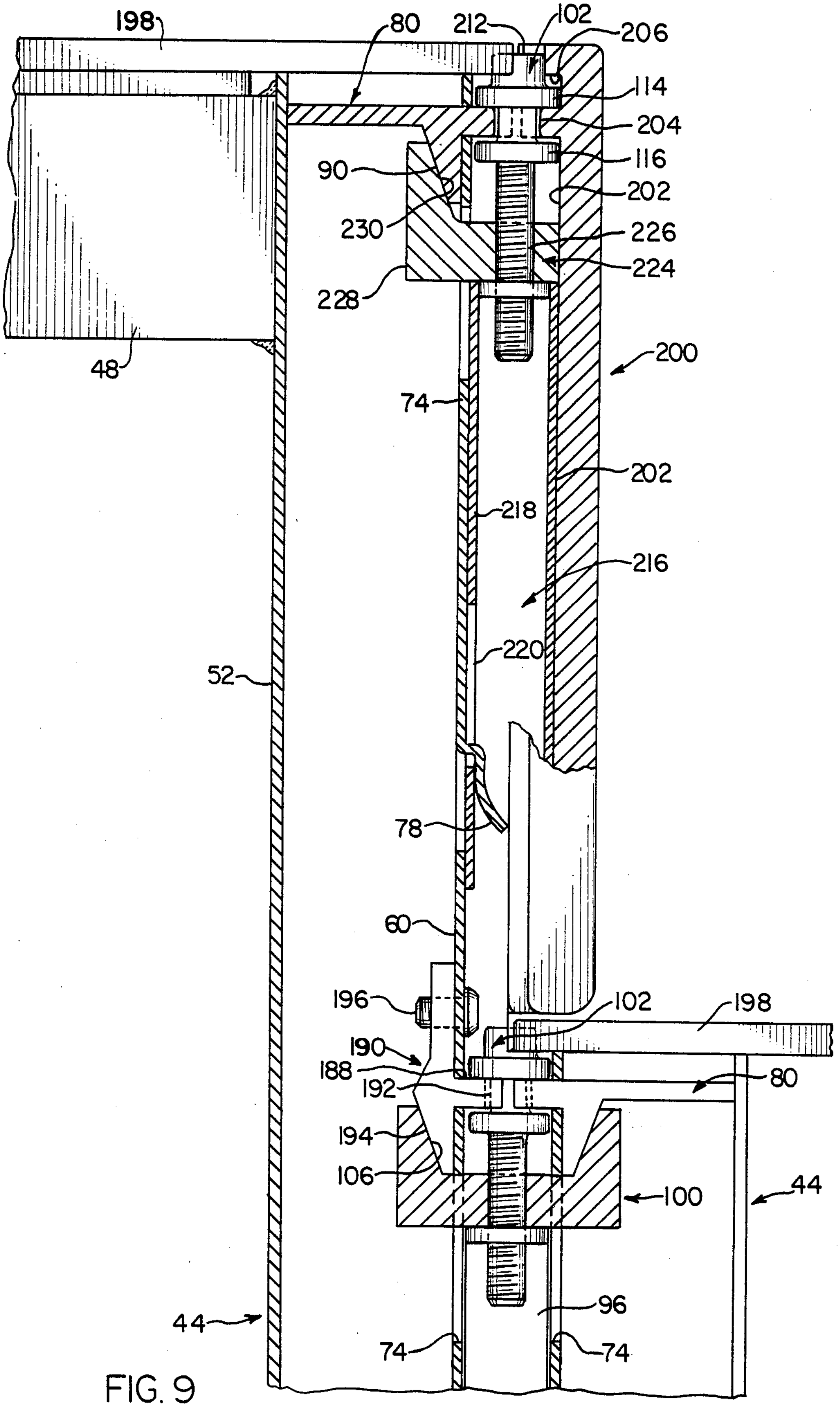
FIG. 9 is a front elevational view in section of an assembled frame connector system between two walls of different height, showing a change-of-height connector system.
Figure 10:
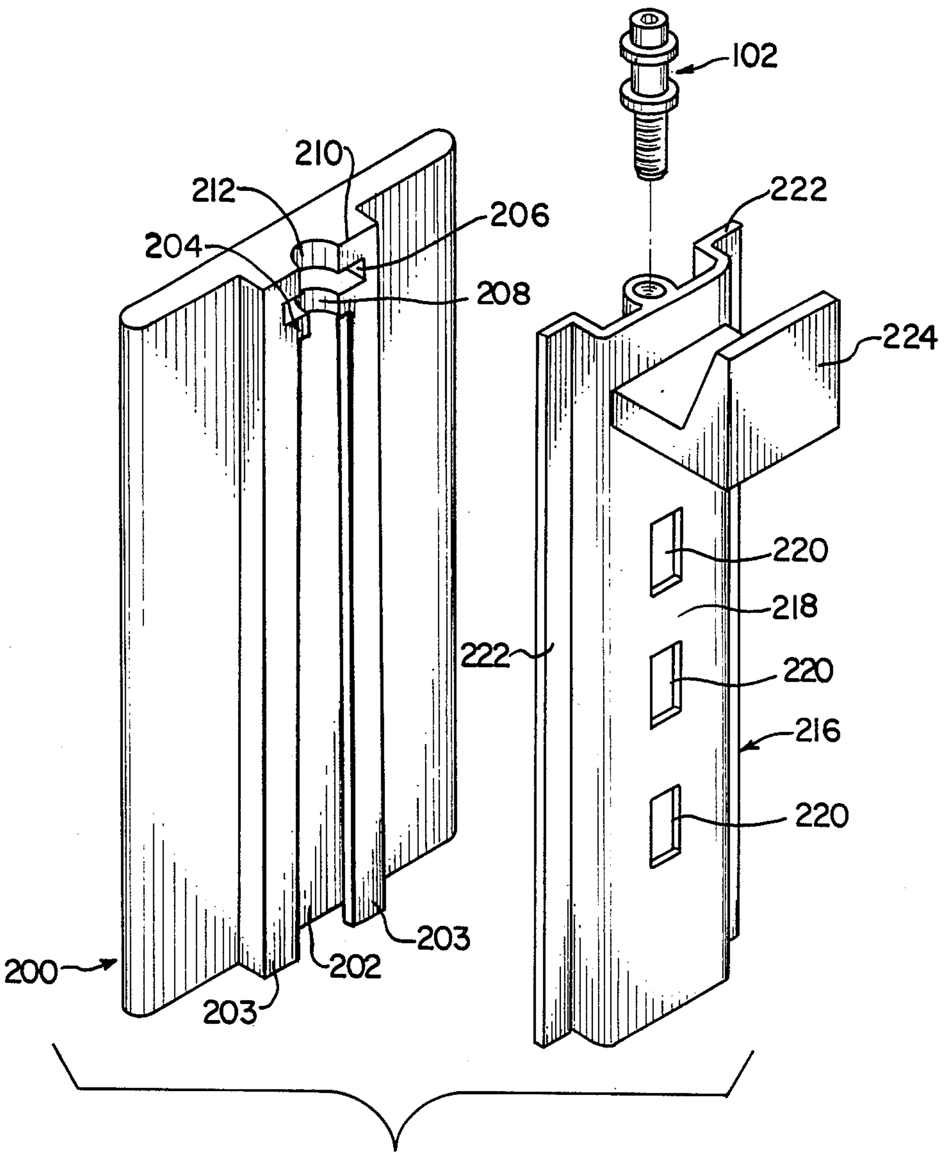
FIG. 10 is an exploded perspective view of several components used in the change-of-height connector system illustrated in FIG. 9.

Referring now to FIGS. 9 and 10, there is shown a connector system for changing height between two wall units. Like numbers are used to describe like parts.

A modified reaction plate 190 is positioned in the taller of the two stiles in juxtaposition to the reaction plate 80 in the adjacent smaller stile. The modified reaction plate 190 can be inserted through an appropriate opening 74 in the wall 60 of the stile and pushed up into place so that an outwardly-projecting tongue 192 of the reaction plate 190 fits through a slotted opening 188 in the wall 60. The reaction plate has a wedging surface 194 of identical shape with the wedging surface 90 of the reaction plate 80. A threaded opening is provided in the upper part of the reaction plate 190 and a threaded fastener passes through the wall 6 and threadably engages the threaded opening in the reaction plate 190 to secure the reaction plate 190 in position in the wall 60.

The stiles of adjacent walls are secured together with a draw nut 100 and threaded shoulder cap screw 102 in the same fashion as described above with respect to the wall units of equal height described above with respect to FIGS. 2–4. The same rigidity between the adjacent frames is provided by this change-of-height connection as in the connection between walls of equal height. A top cap 198 can be positioned on top of each of the walls to cover the upper portion of the frames.

In order to cover the exposed stile above the shorter wall, an end cap 200 and a draw channel 216 are provided. The end cap has an interior channel 202 formed by a pair of L-shaped flanges 203. A pair of shoulders 204 and 210 are provided at the upper portion of the end cap 200 and each shoulder has U-shaped recesses 208 and 212. A pocket 206 is formed between the shoulders 204 and 210.

The draw channel 216 has an elongated U-shaped frame 218 with spaced elongated openings 220 and a pair of outwardly directed flanges 222. A partial draw nut 224 is secured to the upper portion of the frame 218 and has a threaded bore 226 with a leg portion 228 having a wedging surface 230.

As illustrated in FIG. 9, a threaded cap screw 102 is threadably received within the threaded bore 226 of the partial draw nut 224. The shoulder 114 of the cap screw 102 is received within the pocket 206 of the end cap 200 while the shank portion below the shoulder 114 is received in the U-shaped recess 208 of the end cap 200. In like manner, the head of the cap screw 102 is received in the U-shaped recess 212 of the end cap 200. The capscrew shoulder 116 is received beneath the shoulder 204 of the end cap 200.

The leg 228 of the partial draw nut 224 projects through an upper opening 74 in the wall 60 of stile 44 and the wedging surface 230 engages the downwardly-projecting wedging surface 90 of the reaction plate 80. Further, finger 78 extends through opening 220 and is received behind the frame 218 as the draw channel 216 is drawn upwardly with respect to the stile 44. It should be noted that the flanges 222 fit behind the L-shaped flanges 203 of the end cap and thus the draw channel 216 slides freely within the channel of the end cap 200. Thus, the end cap 200 is placed in position as illustrated in FIG. 9 with the draw channel 216 positioned well below the location illustrated in FIG. 9. The leg 228 of the partial draw nut 224 projects through the top opening 74 and the clip 78 projects through the opening 220 in the frame 218. The cap screw 102 is threaded into the partial draw nut 224 to draw the draw channel 216 upwardly with respect to both the stile 44 and the end cap 200.

The invention provides a secure, rigid connector between adjacent frames. The connector has lateral shear strength due to the interrelationship between the draw tube and the indented channel in the outside faces 56. Horizontal rigidity and strength between panels are provided by the wedge means formed between the reaction plate 80 and the draw nut 100. The panels are quickly and easily assembled by placing a draw-tube assembly 94 within a channel of one outside face 56 of a panel, bringing the other panel outside face 56 in close relationship thereto and tightening the threaded shoulder cap screw 102. The connector assembly is economically made through conventional manufacturing techniques. For example, the draw tube 96 and the stiles 44 can be made in conventional roll-forming operation preceded or interspersed with a stamping operation to form the openings and the engagement fingers 78.

Whereas the invention has been described with reference to engagement fingers on the stiles 44 and corresponding openings in the draw tube 96, the engagement fingers can be formed on the draw tube 96 and the corresponding openings can be formed on the stiles 44. Further, the invention has been described with reference to raising the draw tube to engage the wedging surfaces. The invention can also be carried out by adjusting the draw tube downwardly to engage wedging surfaces reversed in orientation. Further, the invention has been described with reference to a rectangular draw tube 96 and correspondingly shaped troughs in the outside faces 56 of the stiles 44. In a broader aspect of the invention, the draw tube 96 and the indented channel in the outside face 56 can take on other complementary shapes so long as the draw tube fits snugly within the indented channel in the outside face 56 and lateral shear strength is accomplished.

Reasonable variation and modification are possible within the scope of the foregoing disclosure and drawings without departing from the spirit of the invention.

The embodiments of the invention in which an exclusive property or privilege is claimed are defined as follows:

1. A connector for rigid frames, each of which has elongated stiles extending the length of opposite ends thereof, each stile having an edge face with an indented channel running along the length thereof and shaped to form a hollow channel with an abutting edge face of an adjacent frame stile said connector comprising;

an elongated draw tube positioned within the hollow channel and having a cross-sectional shape complementary to the hollow channel so as to fit snugly therein;

interengaging wedge means on the draw tube and the stiles so as to draw the abutting edge faces of adjacent frame stiles together upon relative longitudinal movement of the draw tube with respect to the frame stile; and mechanical advantage adjusting means between the adjacent frame stiles and the draw-tube wedge means to forcibly shift the draw tube lengthwise and thereby draw the adjacent frame stiles tightly together, the elongated draw tube and the hollow channel being shaped to provide lateral shear strength between adjacent frames.

2. A connector for rigid frames according to claim 1 wherein said draw-tube wedge means is secured to an upper portion of said draw tube and said stile wedge means is secured to an upper portion of said stile.

3. A connector for rigid frames according to claim 2 wherein said mechanical advantage adjusting means comprises a threaded fastener, one end of which engages said draw-tube wedge means and means on said stile to engage the other end of said threaded fastener.

4. A connector for rigid frames according to claim 3 wherein said draw-tube wedge means is U-shaped in elevation and has legs which extend through openings in said stiles.

5. A connector for rigid frames according to claim 4 wherein the legs of said draw-tube wedge means have an inside surface which slants upwardly and inwardly and said stile wedge means has a complementary surface which extends downwardly to engage said surfaces of said draw-tube wedge means legs.

6. A connector for rigid frames according to claim 5 and further comprising at least one additional opening beneath said interengaging wedge means in either of said indented channel or said draw tube and at least one outwardly and downwardly projecting engagement finger on the other of said indented channel and said draw tube in registry with and projecting into said additional opening as said draw tube is initially positioned within said indented channel, said engagement finger being adapted to engage the other of said draw tube and indented channel as said draw tube is shifted upwardly by said mechanical advantage adjustment means to draw said adjacent stiles together.

7. A connector for rigid frames according to claim 6 wherein there are a plurality of said engagement fingers spaced along the other of the length of the indented channel or the draw tube, and there are a plurality of corresponding additional openings spaced along the indented channel or draw tube.

8. A connector for rigid frames according to claim 7 wherein the engagement finger is struck outwardly from the indented channel of the stiles and have a horizontal flexure axis with the indented channels, the engagement finger further having a strengthening rib extending along the length thereof.

9. A connector for rigid frames according to claim 8 wherein each of the stiles has a side face on each side of the edge face and further comprising a plurality of aligned vertical slots in the stile between the side face and the edge face for engaging and supporting component brackets, wherein furniture components can be supported from the rigid frames through the aligned vertical slots.

10. A connector for rigid frames according to claim 9 wherein said draw tube is rectangular in cross-section and said hollow channel is rectangular in cross-section.

11. A connector for rigid frames according to claim 1 and further comprising at least one additional opening in either of said indented channels or said draw tube, and at least one outwardly-projecting engagement finger on the other of the indented channels and the draw tube in registry and projecting into the additional opening as the draw tube is initially positioned within the indented channel, the engagement finger being adapted to engage the other of the indented channel and the draw tube as the draw tube is shifted lengthwise by the mechanical adjusting means to draw the adjacent stiles together.

12. A connector for rigid frames according to claim 11 wherein there are a plurality of engagement fingers spaced along the length of the other of the indented channel and the draw tube, and there are a plurality of corresponding additional openings spaced along the indented channel or the draw tube in registry with said engagement fingers.

13. A connector for rigid frames according to claim 12 wherein the engagement fingers have a horizontal flexure axis with the indented channel or the draw tube and have a strengthening rib extending vertically along the length thereof.

14. A connector for rigid frames according to claim 13 wherein the engagement fingers are struck outwardly from the indented channels or the draw tube.

15. A connector for rigid frames according to claim 14 wherein each of the stiles has a side face on each side of the edge face and further comprising a plurality of aligned vertical slots in the stiles between the side face and the edge face for engaging and supporting component brackets, whereby furniture components can be supported from the rigid frames through the aligned vertical slots.

16. A connector for rigid frames according to claim 1 wherein each of the stiles has a side face on each side of the edge face and further comprising a plurality of aligned vertical slots in the stiles between the side face and the edge face for engaging and supporting component brackets, whereby furniture components can be supported from the rigid frames through the aligned vertical slots.

17. A connector for rigid frames according to claim 1 wherein said draw-tube wedge means is U-shaped in elevation and has legs which extend through openings in the stiles.

18. A connector for rigid frames, each of which has elongated stiles with an edge face extending the length of opposite ends of the frame said connector comprising;

an elongated draw tube positioned within the channel and having means interengaging with the stiles to provide lateral shear strength between the stiles and the draw tube;

interengaging wedge means on the top of said draw tube and on the top of at least one of said stiles so as to draw the abutting edge faces of the adjacent frame stiles together upon relative longitudinal movement of the draw tube with respect to the frame stiles; and mechanical advantage adjustment means between the adjacent frame stiles and the draw-tube wedge means to forcibly shift the draw tube lengthwise and thereby draw said adjacent frame stile tightly together.

19. A connector for rigid frames according to claim 18 wherein two adjacent frames are of different height, one of said interengaging wedge means is positioned on the higher of said two frames and below the top thereof in juxtaposition to a wedge means on the lower of said frames; and further comprising a cap removably secured to the edge of said higher frame between the top thereof and the top of the shorter of said frames.

20. A connector for rigid frames, each of which has elongated stiles extending the length of opposite ends thereof, each stile having an edge face with an indented channel running along the length thereof said connector comprising a spacer between said stiles of adjacent frames, said spacer having an elongated hollow shape and an edge face forming indented channels extending substantially the length of said spacer, said spacer indented channels being adapted to form a hollow channel with a stile indented channel;

an elongated draw tube positioned within the hollow channel and having a cross-sectional shape complementary to the hollow channel so as to fit snugly therein;

interengaging wedge means on the draw tube, the stile and spacer so as to draw the abutting edge faces of adjacent frame stile and spacer together upon relative longitudinal movement of the draw tube with respect to the frame stile and spacer; and mechanical advantage adjusting means between the adjacent frame stile and spacer, and the draw-tube wedge means to forcibly shift the draw tube lengthwise and thereby draw the frame stile and spacer tightly together, the elongated draw tube and the hollow channel being shaped to provide lateral shear strength between the frame and spacer.

21. A connector for rigid frames according to claim 20 wherein said spacer has a second edge face with an elongated indented channel of equal shape to the indented channel of the first face, and said second face is positioned at an angle less than parallel to said first face so that rigid frames can be connected together in angular relationships other than directly aligned with each other.

* * * * *